United States Patent [19]

Limes et al.

[11] 4,059,455
[45] Nov. 22, 1977

[54] PRODUCTION OF FAST-SETTING BONDED AGGREGATE STRUCTURES

[75] Inventors: Robert W. Limes, Seven Hills; Robert O. Russell, Fairview Park, both of Ohio

[73] Assignee: Republic Steel Corporation, Cleveland, Ohio

[21] Appl. No.: 697,114

[22] Filed: June 17, 1976

[51] Int. Cl.$^2$ .............................................. C04B 35/04
[52] U.S. Cl. .......................................... 106/58; 106/85
[58] Field of Search ..................................... 106/58, 85

[56] References Cited

U.S. PATENT DOCUMENTS

| | | | |
|---|---|---|---|
| 3,285,758 | 11/1966 | Limes et al. | 106/58 |
| 3,879,209 | 4/1975 | Limes et al. | 106/58 |

*Primary Examiner*—J. Poer
*Attorney, Agent, or Firm*—Cooper, Dunham, Clark, Griffin & Moran

[57] ABSTRACT

A method of preparing a fast-setting concrete or the like by mixing, with an aggregate containing magnesia, ammonium phosphates in aqueous solution, wherein the composition of the phosphates is about 20% to 58% by weight polyphosphates, balance orthophosphate.

6 Claims, 4 Drawing Figures

PRODUCTION OF FAST-SETTING BONDED AGGREGATE STRUCTURES

BACKGROUND OF THE INVENTION

This invention relates to methods of making fast-setting bonded aggregate structures, having utility for various purposes for which concrete and conventional refractories are employed, by mixing an aggregate containing magnesia with ammonium phosphates in aqueous solution. In an important specific aspect, the invention is particularly directed to the production of fast-setting, phosphate-bonded, magnesia-containing aggregate structures having utility as concretes e.g. for outdoor load-bearing use.

It has heretofore been known that fast-setting structures having advantageous properties for diverse uses can be produced by mixing, with a magnesia-containing aggregate, ammonium phosphates in aqueous solution, provided that the composition of the phosphates is at least about 60% by weight pyrophosphate and higher polyphosphates. U.S. Pat. No. 3,879,209 describes a method of producing a concrete structure by establishing such a mixture, introducing it to a form defining a shaped open space, and allowing it to set for an extended period at ambient atmospheric temperature. The structure thus produced progressively develops hydraulic strength, forms a strong bond with existing concrete or other surfaces, and has low porosity, so as to be capable of outdoor load-bearing use e.g. for paving or repairing roadways. U.S. Pat. Nos. 3,285,758 and 3,413,385 describe methods of making or repairing refractory linings or walls with such mixtures, wherein the produced structure develops high porosity (as desired for thermal insulation) by exposure to elevated temperature during or shortly after application of the mixture.

The mixtures employed in the methods of the aforementioned patents set, and develop usable strength, much more rapidly than conventional materials. Nonetheless, for some purposes, even faster setting times and higher early strengths (i.e. strength developed within at most a few hours of setting) would be desirable. For instance, in the repair of concrete sea walls exposed only at low tide, it would be desirable to use a patching composition that sets and develops substantial strength within a single period of exposure of the wall. Again, for road repairs, accelerated development of strength of a path would advantageously shorten the time during which the patched roadway must be kept out of service.

SUMMARY OF THE INVENTION

The present invention embraces the discovery that ammonium phosphates having a polyphosphate content between about 20% and 58% may be used (i.e. in place of phosphates containing at least about 60% polyphosphates) in procedures such as those described in the aforementioned patents, and the further discovery that such use of these phosphates significantly enhances rapidity of setting and early strength. Accordingly, in a broad sense, the invention contemplates the provision of a method of producing bonded aggregate structures including the steps of establishing a mixture of an aggregate containing at least about 1% magnesia and ammonium phosphates in aqueous solution, in an amount equal to at least about one part of $P_2O_5$ per one hundred parts of aggregate, wherein the composition of the phosphates is between about 20% and 58% polyphosphates; disposing the mixture for setting; and allowing the mixture to set as thus disposed. It will be understood that all proportions and percentages herein set forth are expressed by weight unless otherwise specifically stated, and that the term "polyphosphates" herein embraces pyrophosphate as well as higher (e.g. tri- and tetra-) polyphosphates.

Stated in other words, it has now been found that, for mixtures of magnesia-containing aggregates with ammonium phosphates having a polyphosphate content ranging upwardly from about 20%, the rapidity of setting and the early strength developed are inversely related to the polyphosphate content; and that, for mixtures of magnesia-containing aggregates with ammonium phosphates having a polyphosphate content of 58% or below, the development of strength per unit time in ambient temperature setting differs in a significant and surprising way from that occurring when phosphates having a polyphosphate content of about 60% or more are used, being initially more rapid, and in later stages more gradual, than in the case of use of the latter phosphates. Of course, the absolute values of setting time and early strength are also dependent on such additional factors as the nature of the aggregate and the temperature conditions of setting; but in any particular instance, with these other factors held constant, the setting time may be reduced and the early strength increased by using phosphates having a lower polyphosphate content. The discovery of this relationship between setting time and early strength and polyphosphate content affords advantageous flexibility in achievement of desired mixture properties, i.e. by appropriate selection of the polyphosphate content of the phosphates used.

In one specific sense, the invention contemplates the provision of methods of producing fast-setting concretes for roadway patches or other outdoor load-bearing use or the like. Particular embodiments of these methods may be identical to the procedures disclosed and claimed in the aforementioned U.S. Pat. No. 3,879,209 (which is incorporated herein by this reference) except that, in accordance with the present invention, the composition of the phosphates used is about 20% to 58% polyphosphates, balance orthophosphate. It is found that with use of these phosphates in such procedures, usable levels of strength (i.e. cold crushing strength) are achieved much more rapidly than when phosphates containing about 60% or more polyphosphates are employed. Thus, for example, a roadway patched by procedure in accordance with the present invention may be returned to service more quickly than has heretofore been possible, and the procedure may be employed with advantage to produce structures for use in environments requiring especially rapid setting and/or strength development.

The cold crushing strength ultimately achieved in structures produced by the method of the invention, and allowed to set for extended periods at ambient temperature, may be slightly lower than that attained when phosphates having a polyphosphate content of 60% or above are used; however, for most purposes (including ordinary highway patching), the strengths attainable with the present invention are entirely adequate, as are other properties such as bonding strength and porosity. Phosphates containing about 20% to 58% polyphosphate have a somewhat briefer shelf life than phosphates containing 60% or more polyphosphate, but nevertheless remain usable for practicably long periods (e.g. several months or more after production); also, their solubility in water is comparable to that of phosphates having a polyphosphate content of 60% or above, solutions of 30% phosphate concentration or higher (e.g. 34%–37%) being readily provided, in contrast to straight ammonium orthophosphate which has a solubility too low for effective use in procedures as herein contemplated.

The methods of the present invention are, in an important sense, complementary to those described in the aforementioned patents. That is to say, for example, in cases where (for ease and convenience of operation or handling) it is desired to avoid extremely short setting times, the prior methods may be used; but where very rapid setting and/or high early strength are sought, the present methods will be employed.

Further features and advantages of the invention will be apparent from the detailed description hereinbelow set forth, together with the accompanying drawings.

DETAILED DESCRIPTION

Figure 1:
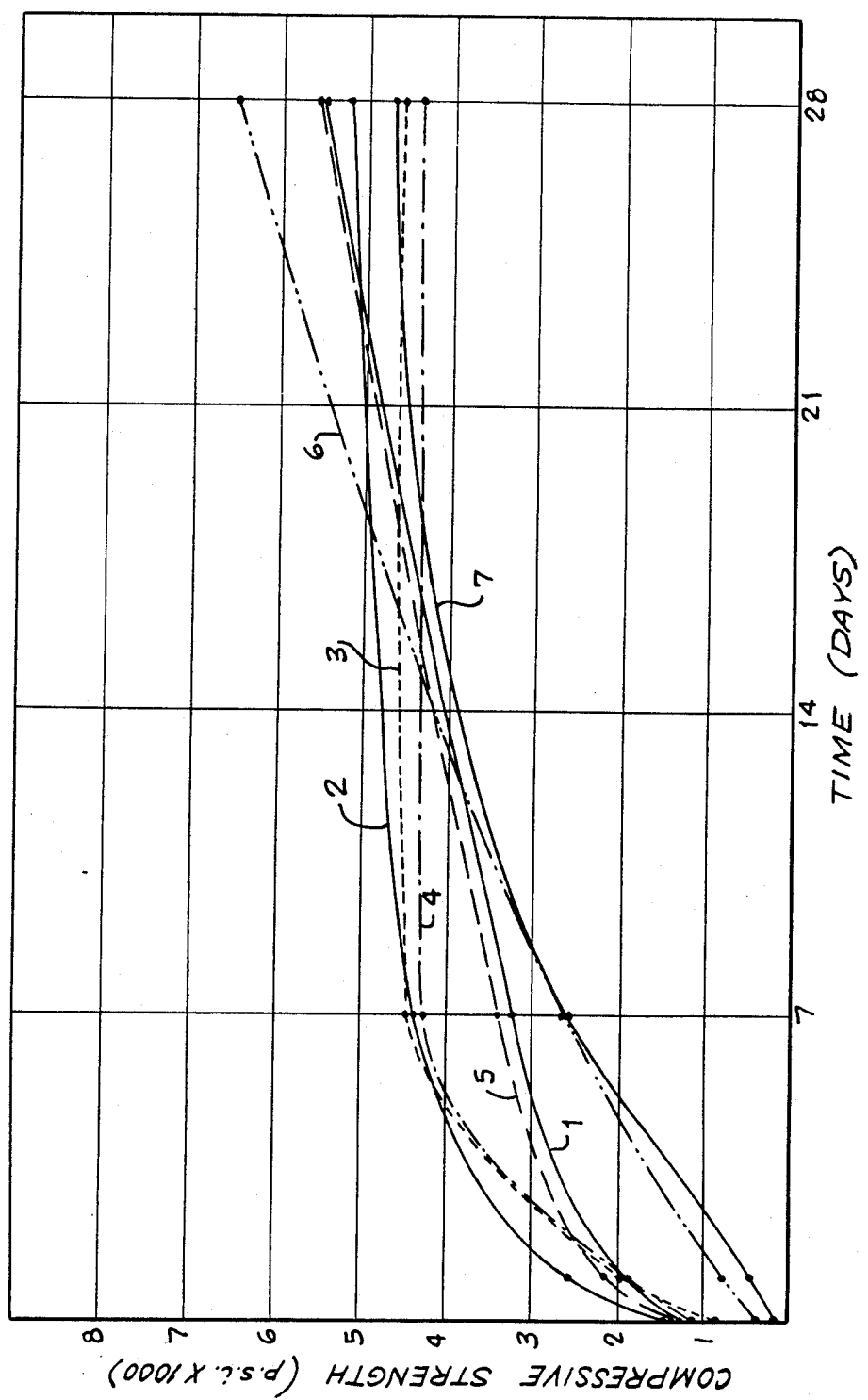
FIGS. 1 and 2 are graphs respectively illustrating the relationship between development of crushing strength and time of ambient-temperature setting for the mixtures described in Examples I and II below, including products of the method of the present invention.

For purposes of illustration, the invention will be described as embodied in procedures for producing fast-setting concrete structures, e.g. structures suitable for roadway patches or other outdoor load-bearing use, it being understood, however, that in its broader aspects the invention is generally applicable to the preparation of concrete or refractory structures of high or low strength and/or porosity (depending e.g. on the nature of the aggregate employed and the temperature conditions of application and/or setting of the aggregate-phosphate mixture) for a variety of other purposes as well.

As a particular feature thereof, the invention employs, as a starting material, ammonium phosphates in aqueous solution wherein the composition of the phosphates is about 20% to 58% polyphosphates (principally pyrophosphate in most cases, together with minor amounts of higher polyphosphates, or even essentially all pyrophosphate), balance orthophosphate. Typically, the solution contains about 8% to about 12% ammoniacal nitrogen and about 30% to about 38% $P_2O_5$; specific examples of nominal concentrations are 10% ammoniacal nitrogen, 34% $P_2O_5$, and 11% ammoniacal nitrogen, 37% $P_2O_5$. Such solutions commonly contain about 50% water, balance minor amounts of impurities as in the case of the solutions described in U.S. Pat. No. 3,879,209. That is to say, the phosphate solutions employed in the practice of the invention may be essentially identical to those described in the last-cited patent except that the polyphosphate content of the phosphates is, as stated, between about 20% and about 58% rather than at least about 60%. As that patent states, in addition to the polyphosphate content, the ammonium component is also essential for attainment of the desired results of the invention.

Such ammonium phosphate solutions can be prepared by ammoniation of polyphosphoric acid, as further described in the aforementioned U.S. Pat. No. 3,879,209. Polyphosphoric acid may be represented by the formula

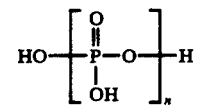

If $n = 1$, the acid is orthophosphoric; if $n = 2$, the acid is pyrophosphoric; if $n = 3$, the acid is triphosphoric; if $n = 4$, the acid is tetraphosphoric, etc. The corresponding ammonium phosphates (i.e. orthophosphate, pyrophosphate, tripolyphosphate, etc.) are represented by substitution of the ammonium radical ($NH_4^+$) for the $H^+$ in one or more of the hydroxy groups in the above formula, such substitution being effected by ammoniation. Procedures for ammoniation are well known in the art and accordingly need not be described in detail; one such known procedure, especially convenient for preparation of phosphates having a selected polyphosphate content within the range employed in the present invention, involves reaction of wet-process superphosphoric acid with gaseous ammonia in a so-called pipe reactor.

The product of this procedure is a mixture of ammonium phosphates in aqueous solution, typically including orthophosphate, pyrophosphate, and small amounts of higher polyphosphates, and typically having the concentration known in the fertilizer art as 10-34-0 or 11-37-0. Appropriate selection of process variables to produce, in these solutions, desired relative amounts of orthophosphate and polyphosphates (comprising or including pyrophosphate) within the range of about 20% to 58% polyphosphates will be readily apparent to those skilled in the art of making ammonium phosphate solutions.

In the practice of the present invention, an aqueous solution of ammonium phosphates is mixed with an aggregate containing at least about 1% magnesia, preferably (in many instances) at least about 10% magnesia. Stated generally, any suitable aggregate having the specified magnesia content may be employed, examples of such aggregates being those described in the aforementioned U.S. Pat. No. 3,879,209, including mixtures of particulate magnesia with such inert or relatively inert particulate solids as crushed brick, raw dolomite, limestone, etc. The magnesia used may be highly calcined or dead-burned magnesia of fine particular sizes, or may be provided as calcined dolomite, which has a substantial magnesia content; i.e. any particulate magnesia capable of reacting with the phosphates to produce a bonded structure may be employed. Aggregate particle size is not critical, being selected for attainment of desired density and other properties in the produced structure. Exemplary aggregate particle sizes suitable for the present invention include all those set forth in the last-cited patent.

Two specific examples of aggregates for use in the methods of the present invention are as follows:

| Material | % | Mesh Size (Tyler) |
| --- | --- | --- |
| Aggregate A | | |
| Sand | 80 | −35 |
| Dead-burned magnesia | 20 | −100 |
| Aggregate B | | |
| No. 8 dolomite | 80 | * |
| Dead-burned magnesia | 20 | −100 |

* a typical screen analysis is set forth in U.S. line No. 3,879,209 at col. 8, lie 60 to col. 9, line 8.

The method of the inventio includes the step of establishing a mixture of ammonium phosphates in aqueous solution and an aggregate, both as described above. For producing a concrete structure of the general type described in the last-cited patent, the amount of phosphates mixed with the aggregate is equal to at least about 3 parts (preferably about 3 to about 10 parts) of $P_2O_5$ per 100 parts of aggregate, although for other applications as little as one part of $P_2O_5$ per 100 parts of aggregate may be used. For solutions containing about 34 to about 37% $P_2O_5$, the range of 3-10 parts $P_2O_5$ per 100 parts of aggregate corresponds to a range of about 8.1 to about 29.4 parts of phosphate solution per 100 parts of aggregate; thus, in one illustrative instance, 22.5 parts of phosphate solution were mixed with 100 parts of aggregate.

Owing to the very rapid setting times achieved with the present invention using polyphosphate contents of about 20% to 58% (based on total phosphates), the magnesia-containing aggregate should be kept away from contact with the phosphate solution until a time just prior to application of the mixture for setting; i.e. mixing should occur immediately before, or even during, delivery of the mixture to the locality at which it is to set. Such mixing may be performed in any of the ways described in the aforementioned U.S. Pat. No. 3,879,209, e.g. in a small mixer located at the site of application of the mixture, or in a so-called "gun" (e.g. of known design) for applying the mixture. In any event, the mixing is conducted in a manner to assure thorough wetting of the aggregate particles with the phosphate solution.

Immediately upon mixing, the phosphate-aggregate mixture is disposed for setting, e.g. by introduction thereof to a form defining a shaped open space. For instance, the form may be a conventional wooden frame, or the walls of a crack or crevice or spalled area of a concrete roadway which is to be repaired. Alternatively, the mixture may be applied as a layer on a surface (e.g. a steel beam or pipe surface) to be coated. The just-mixed mixture is sufficiently workable so that it may be applied in a manner conventionally used for application of concrete or the like, as by trowelling, ramming, or gunning. Any surface smoothing or shaping of the mixture (after deposit thereof in or at the locality at which it is to set) must be performed at once, before setting occurs.

Stated further with reference to the production of concrete structures, the mixture is applied at an ambient atmospheric temperature (i.e. at a temperature below 212° F, and very preferably below about 150° F) and thereafter continuously maintained out of exposure to any higher temperature, for a setting period of preferably at least about 7 to about 28 days; i.e., the mixture is applied and thereafter maintained in a situation of ambient atmospheric temperature at least until substantial hydraulic strength is developed in the resultant structure. Indeed, in many or most instances, as in the case of highway patches, the structure ordinarily remains at ambient temperature throughout its useful lifetime.

The mixture thus applied sets within a few minutes after the aggregate and solution first come into contact. In this initial period, an exothermic reaction occurs, with noticeable (but not excessive or inconvenient) generation of heat and evolution of gaseous ammonia. Thereafter, the set structure (maintained in the described ambient temperature situation) progressively develops hydraulic strength, e.g. attaining a cold crushing strength substantially in excess of 4,000 p.s.i., while bonding strongly to concrete or metal or other surfaces with which it is in contact and maintaining a low porosity (less, and ordinarily much less, than 5%) as is necessary to enable an outdoor concrete structure to withstand exposure to freeze-thaw conditions. Within at most a few hours of setting, a road pavement or patch produced in accordance with the invention is capable of withstanding ordinary highway loads, and may be placed in service.

That is to say, the method of the invention enables production of concrete structures generally comparable in final properties to those produced by the method of the aforementioned U.S. Pat. No. 3,879,209. Although the crushing strength ultimately attained by the products of the invention may be slightly lower than those achieved by the method of the prior patent, they are quite sufficient for most highway uses and other applications. In respect to setting time and early strength, however, the structures produced by the present invention differ very significantly (and for many purposes advantageously) from those of the prior method.

Figure 2:
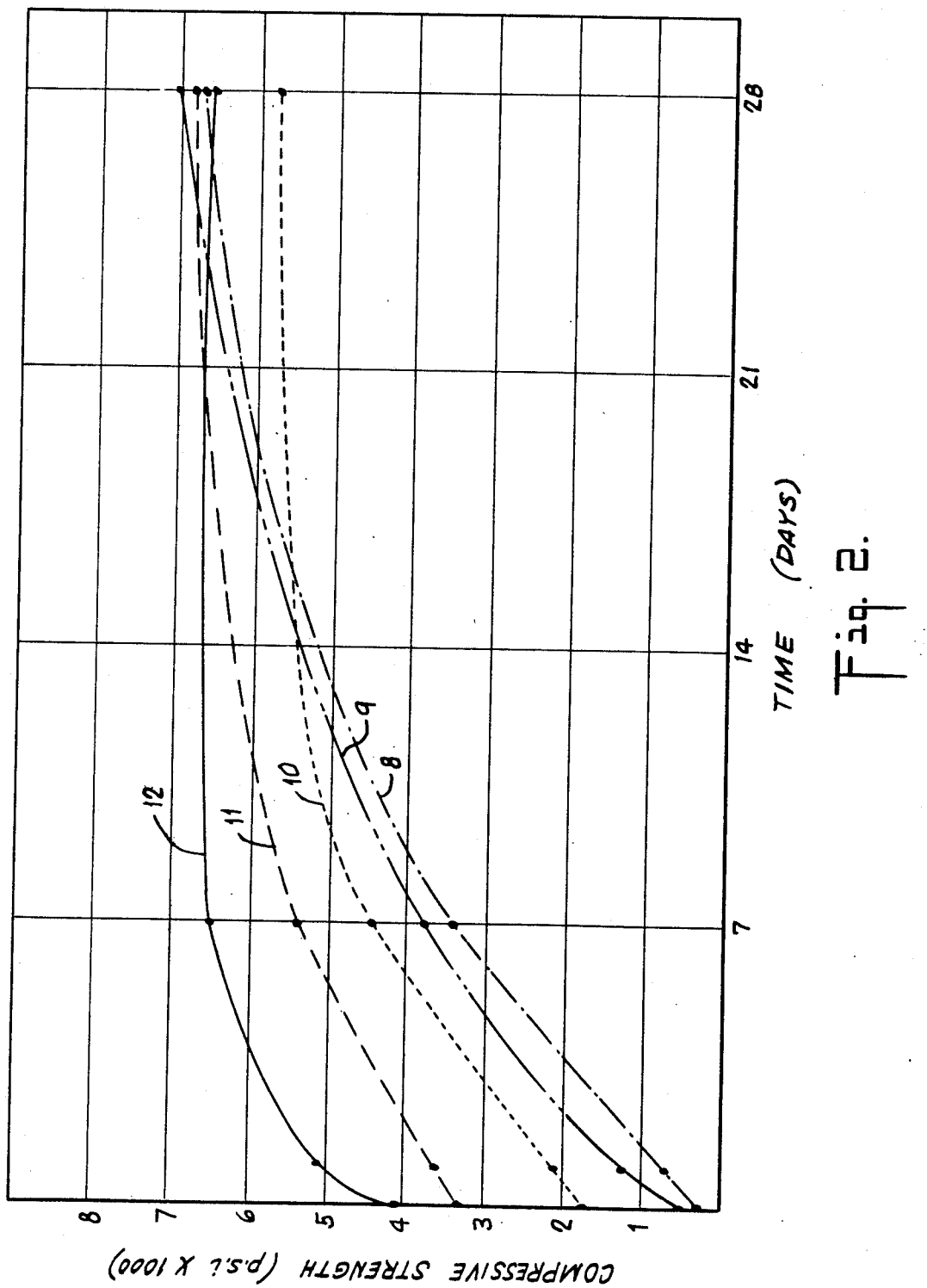

Referring now to FIGS. 1 and 2, the curves there shown represent development of strength, per unit time of ambient-temperature setting after mixing, for structures produced with phosphates having varying proportions of polyphosphates. Details of production of these structures are described further in Examples I and II below. FIG. 1 (corresponding to Example I) shows curves for structures prepared from 10-34-0 phosphate solutions; specifically, the curves numbered 2, 3 and 4 represent structures produced in accordance with the invention, i.e. using phosphates having a polyphosphate content of 58% or less, while curves 1, 5, 6 and 7 represent structures produced with phosphates whereof 60% or more were polyphosphates. Similarly, in FIG. 2, which corresponds to Example II and shows curves for structures produced with 11-37-0 phosphate solutions, curves 10, 11 and 12 represent structures produced in accordance with the invention while curves 8 and 9 represent structures produced with phosphates having a polyphosphate content above 60%. All tests were made with mixtures of 22.5 parts of the specified phosphate solution and 100 parts of the above-described aggregate B; the aggregate composition was identical in all cases.

The curves for structures produced in accordance with the invention, in FIGS. 1 and 2, differ clearly in character from those for structures made with phosphates having a polyphosphate content of 60% or above. In particular, the curves for the products of the invention rise sharply over the first seven days or more after setting, and then flatten markedly during the latter part of the 28-day interval covered by the graphs, whereas the curves for mixtures having higher levels of polyphosphate content continue to rise throughout the entire 28-day interval. Thus, up to at least about 14 days, the compressive strengths of the products of the method of the invention are all higher than those of the products made from phosphate solutions having more than 60% polyphosphate. At the end of 28 days, the compressive strengths of the latter products are, in general, higher than those of the products of the invention; nevertheless, all these structures have attained compressive strengths in excess of 4,000 p.s.i., fully adequate for such uses as highway patching.

Figure 3:
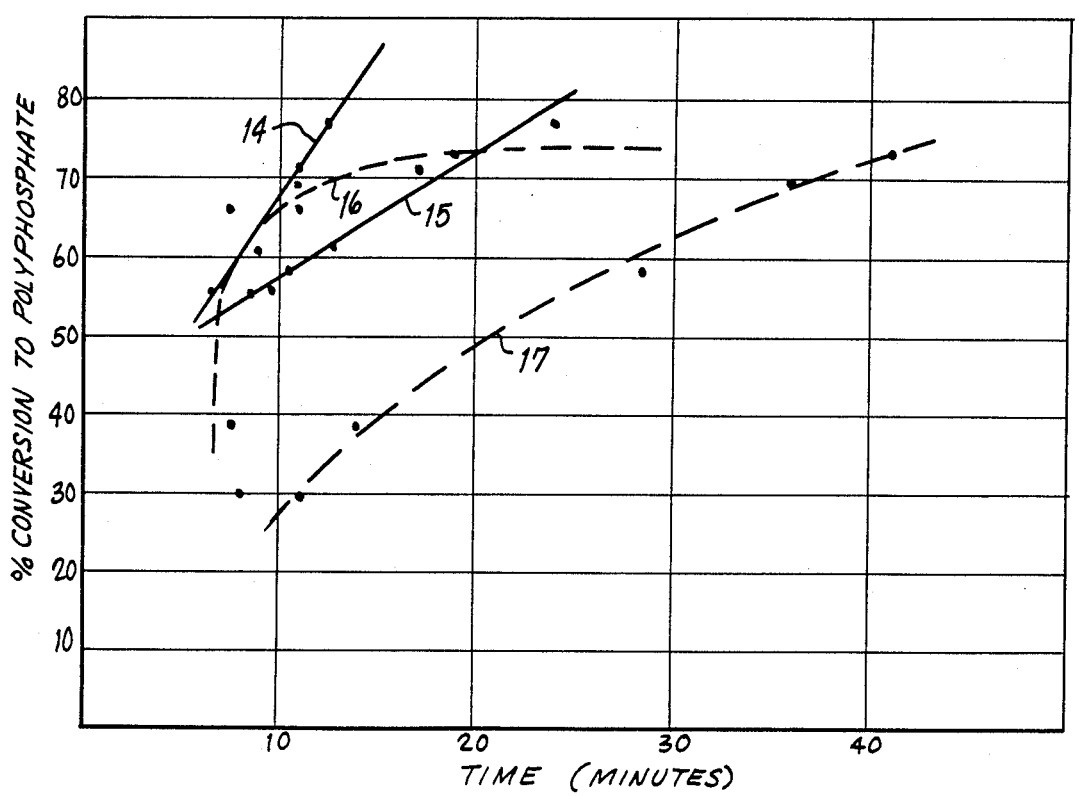
FIG. 3 is a graph showing initial and final setting times, as a function of polyphosphate content, for the mixtures of Examples I and II.

FIG. 3 plots initial and final setting times (in minutes) against percent polyphosphate for mixtures prepared with the same phosphate solutions represented by the curves of FIGS. 1 and 2, in proportions of 22.5 parts of phosphate solution to 100 parts of the above-described aggregate A. In this figure, curves 14 and 15 respectively represent initial and final setting times for mixtures prepared with the 10-34-0 phosphate solutions of Example I below, while curves 16 and 17 respectively represent initial and final setting times for mixtures prepared with the 11-37-0 phosphate solutions of Example II below. The graph illustrates that each of these setting times decreases significantly with decrease in polyphosphate content of the phosphates.

Figure 4:
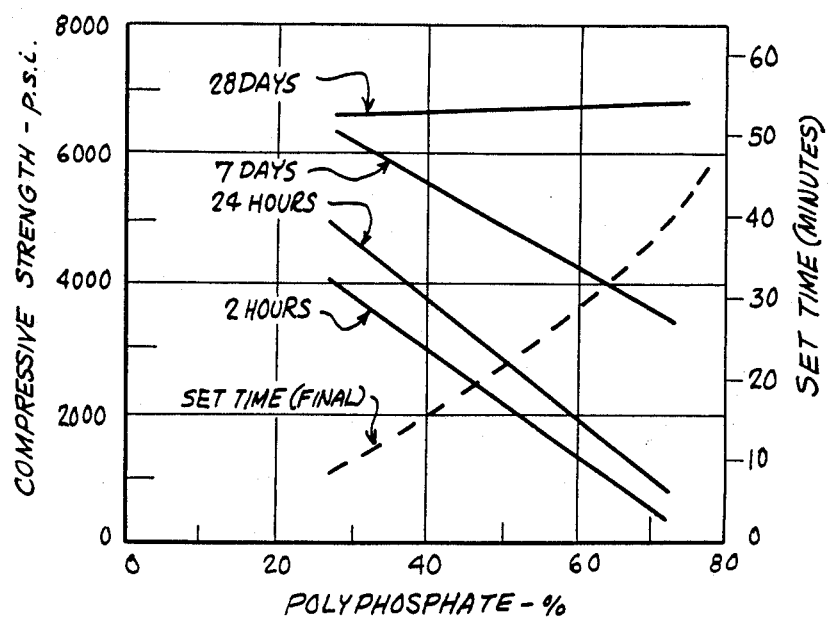
FIG. 4 is a graph relating setting time, and crushing strengths developed after various specified periods of ambient-temperature setting, to polyphosphate content for mixtures of magnesia-containing aggregates and ammonium phosphates in aqueous solution.

FIG. 4 shows the compressive strengths developed over various periods (2 hours, 24 hours, 7 days, and 28 days), and also the final set time, all as functions of polyphosphate content, for exemplary concrete structures prepared in accordance with the invention, i.e., with all factors other than polyphosphate content held constant. This graph illustrates that for all periods up to seven days, the compressive strength increases sharply with decrease in polyphosphate content, although the 28-day compression strength increases slightly with increase in polyphosphate content.

Thus, in summary, the method of the invention provides a significant decrease in setting time, and a very marked increase in early strength, as compared with procedures utilizing phosphates having a polyphosphate content of 60% or more. In further illustration of these advantageous results, reference may be made to the following specific examples:

EXAMPLE I

A series of tests were performed to determine setting times and compressive strengths of concrete mixtures prepared from ammonium phosphate solutions (nominally 10-34-0 concentrations) produced in a pipe reactor and having the following chemical and physical characteristics:

| Solution No. | % N | % $P_2O_5$ | % polyphosphate | pH | Specific Gravity (at 78° F) |
|---|---|---|---|---|---|
| 1 | 9.84 | 33.90 | 65.75 | 5.77 | 1.392 |
| 2 | 9.89 | 33.52 | 55.73 | 5.92 | 1.390 |
| 3 | 10.03 | 33.89 | 57.93 | 5.90 | 1.392 |
| 4 | 10.04 | 33.19 | 54.98 | 6.02 | 1.390 |
| 5 | 10.2 | 33.95 | 60.6 | 6.17 | 1.400 |
| 6 | 10.1 | 33.92 | 70.9 | 6.15 | 1.399 |
| 7 | 10.0 | 33.50 | 76.5 | 6.32 | 1.390 |

To determine setting time, 22.5 parts of each of these solutions was mixed with 100 parts of the above-described aggregate A and the resultant mixtures, while workable, were formed into disk-shaped samples each 2¼ inches in diameter and ½ inch thick. Setting times were ascertained with the Gillmore needle apparatus described in ASTM standard No. C 266-74 for testing time of setting of hydraulic cement. Time of initial and final setting (as defined in that standard) for mixtures respectively made with the seven solutions were found to be as follows:

| Solution No. | Initial Set Time (minutes) | Final Set Time (minutes) |
|---|---|---|
| 1 | 7 - 7¼ | 11 |
| 2 | 7 | 9¼ |
| 3 | 7¼ | 10¼ |
| 4 | 6¼ - 7 | 8¼ - 9 |
| 5 | 9 | 12¼ - 13 |
| 6 | 11 | 17 |
| 7 | 12¼ - 13 | 24 |

Compression strengths were tested by mixing 22.5 parts of each phosphate solution with 100 parts of the above-described aggregate B, and each of the resultant mixtures was formed, while workable, into several cylinders 2¼ inches in diameter and 5 inches long. The cylinders were allowed to set at ambient atmospheric temperature for various periods, and then tested for compressive strength by crushing at a rate of 1,780 lb./min. Results were as follows:

| Solution No. | Compressive Strength (p.s.i.) | | | |
|---|---|---|---|---|
| | 2 hrs. | 24 hrs. | 7 days | 28 days |
| 1 | 725 | 1865 | 3270 | 5420 |
| 2 | 1310 | 2580 | 4390 | 5195 |
| 3 | 1335 | 1900 | 4435 | 4560 |
| 4 | 1230 | 1900 | 4345 | 4380 |
| 5 | 900 | 2150 | 3310 | 5430 |
| 6 | 320 | 775 | 2625 | 6425 |
| 7 | 165 | 425 | 2670 | 4675 |

EXAMPLE II

The procedure of Example I was repeated with the following six phosphate solutions, again produced in a pipe reactor and having nominal concentrations of 11-37-0:

| Solution No. | % N | % $P_2O_5$ | % polyphosphate | pH | Specific Gravity | |
|---|---|---|---|---|---|---|
| 8 | 10.31 | 37.55 | 72.84 | 6.1 | 1.440 | (76° F) |
| 9 | 11.13 | 37.39 | 68.94 | 5.91 | 1.439 | (76° F) |
| 10 | 11.24 | 37.88 | 57.95 | 5.92 | 1.444 | (76° F) |
| 11 | 11.05 | 36.93 | 38.48 | 5.9 | 1.435 | (78° F) |
| 12 | 11.00 | 36.42 | 29.63 | 5.9 | 1.430 | (78° F) |
| 14 | 11.08 | 36.71 | 47.13 | 5.97 | 1.435 | (76° F) |

Setting times were determined to be as follows:

| Solution No. | Initial Set Time (minutes) | Final Set Time (minutes) |
|---|---|---|
| 8 | 19 | 41 |
| 9 | 10¼ | 36 |
| 10 | 7 - 7¼ | 28 - 28¼ |
| 11 | 7 - 8 | 14¼ |
| 12 | 8 | 11 |
| 14 | no data | no data |

Compression strengths, after various periods of ambient-temperature setting, were as follows:

| Solution No. | Compressive Strength (p.s.i.) | | | |
|---|---|---|---|---|
| | 2 hrs. | 24 hrs. | 7 days | 28 days |
| 8 | 330 | 710 | 3435 | 6720 |
| 9 | 485 | 1245 | 3770 | 7060 |
| 10 | 1790 | 2130 | 4440 | 5800 |
| 11 | 3590 | 3400 | 5420 | 6865 |
| 12 | 3320 | 5135 | 6565 | 6640 |
| 14 | 2140 | 3680 | 4240 | no data |

When a portion of solution No. 14 was diluted to 10-34-0 concentration, setting times for mixtures made therewith were determined, by the same procedure as above, to be 6 – 6¼ minutes (initial) and 8 minutes (final); compressive strengths developed were 2210 p.s.i. at 2 hours, 3300 p.s.i. at 24 hours, and 3870 p.s.i. at 7 days.

A further ammonium phosphate solution (No. 13), prepared as a small batch in a bucket, had a concentration of 8.74% N, 30.42% $P_2O_5$, a polyphosphate content of 22.22%, a pH of 5.68, and a specific gravity of 1.356 at 76° F. Compressive strength tests of mixtures made with this solution gave 4125 p.s.i. at 2 hours and 6650 p.s.i. at 7 days.

The composition of the aggregate A in the above-described setting time tests was identical in all cases, and similarly the composition of the aggregate B in the crushing tests was identical in all cases, to avoid introducing variables resulting from differences in aggregate composition.

It will be understood that the reference numerals 1-12 in FIGS. 1 and 2 respectively refer to mixtures made with phosphate solutions designated by the corresponding numbers in the foregoing examples.

Summarizing the test data set forth in Examples I and II above, all the mixtures produced in accordance with the invention (i.e. those containing solutions 2, 3, 4, 10, 11, 12, 13 and 14, wherein the polyphosphate content of the phosphates was below 58%) had compressive strengths above 1,200 p.s.i. after 2 hours of ambient temperature setting, and achieved more than 75% of their final 28-day compressive strengths in the first 7 days of ambient-temperature setting. In contrast, none of the mixtures using phosphates containing over 60% polyphosphate exceeded 900 p.s.i. in compressive strength after 2 hours, and most had far lower 2-hour strengths; also, none of the latter mixtures reached even 61% of final 28-day strength in the first seven days of setting. Although the mixtures made with solution 14 were inferior in strength for undetermined reasons, all the other samples in accordance with the invention (and even the samples using solution 14 at 37% nominal $P_2O_5$ concentration) ultimately attained compressive strengths in excess of 4,000 p.s.i., which is considered acceptable for highway applications.

It is to be understood that the invention is not limited to the features and embodiments hereinabove specifically set forth, but may be carried out in other ways without departure from its spirit.

What is claimed is:

1. A method of making a fast-setting bonded aggregate structure, comprising the steps of
   a. establishing a mixture of
      i. an aggregate containing at least about 1% magnesia and
      ii. ammonium phosphate in aqueous solution in an amount equal to at least about one part of $P_2O_5$ per 100 parts of said aggregate, the composition of said phosphates being between about 20% and 58% polyphosphates, balance orthophosphate;
   b. disposing said mixture for setting, promptly after establishment thereof; and
   c. allowing said mixture to set as thus disposed, while
   d. continuously maintaining said mixture, throughout the performance of steps (a) and (b) and for at least the first several days of performance of step (c), in a situation of ambient atmospheric temperature not exceeding about 150° F.

2. A method according to claim 1, wherein the amount of said ammonium phosphates is equal to not more than about 10 parts of $P_2O_5$ per 100 parts of said aggregate.

3. A method according to claim 2, wherein the amount of said ammonium phosphates is equal to at least about 3 parts of $P_2O_5$ per 100 parts of said aggregate.

4. A method according to claim 1, wherein said phosphates are present in said solution in a concentration of at least about 30%.

5. A method of producing a fast-setting concrete structure, comprising the steps of
   a. establishing a mixture of
      i. an aggregate containing at least about 10% magnesia and
      ii. ammonium phosphates in aqueous solution in an amount equal to between about 3 and about 10 parts of $P_2O_5$ per 100 parts of said aggregate, the composition of said phosphates being between about 20% and 58% polyphosphates, balance orthophosphate;
   b. disposing said mixture for setting, promptly after establishment thereof; and
   c. allowing the mixture to set as thus disposed, while
   d. continuously maintaining said mixture, throughout the performance of steps (a) and (b) and for at least the first several days of performance of step (c), in a situation of ambient atmospheric temperature not exceeding about 150° F.

6. A method according to claim 5, wherein the maintaining step comprises maintaining said mixture in said ambient temperature situation during step (c) for a period sufficient for the mixture to attain a compressive strength of at least about 4,000 p.s.i.

* * * * *